United States Patent [19]

Miyake et al.

[11] 3,923,927

[45] Dec. 2, 1975

[54] POLYESTER COMPOSITION CONTAINING SATURATED POLYESTER UNSATURATED TEREPHTHALATE POLYESTER AND VINYL MONOMER

[75] Inventors: Hideo Miyake; Toshiaki Fuzimura, both of Otsu, Japan

[73] Assignee: Toyo Boseki Kabushiki Kaisha, Osaka, Japan

[22] Filed: Feb. 20, 1974

[21] Appl. No.: 444,069

[30] Foreign Application Priority Data
Feb. 23, 1973 Japan.................................. 48-22522

[52] U.S. Cl.............. 260/861; 260/40 R; 260/47 C; 260/75 R; 260/860; 260/862
[51] Int. Cl.².......................................... C08L 67/00
[58] Field of Search..................................... 260/861

[56] References Cited
UNITED STATES PATENTS

| | | | |
|---|---|---|---|
| 3,736,278 | 5/1973 | Wada et al............................ | 260/861 |
| 3,795,716 | 3/1974 | Hokama............................... | 260/861 |

FOREIGN PATENTS OR APPLICATIONS

| | | | |
|---|---|---|---|
| 937,703 | 9/1963 | United Kingdom.................. | 260/861 |

*Primary Examiner*—Paul Lieberman
*Attorney, Agent, or Firm*—Kaufman & Kramer

[57] ABSTRACT

An unsaturated polyester resin composition which can give a cure-molded product having excellent low shrink properties and low profile, which comprises A. 70 to 97 parts by weight of at least one unsaturated polyester resin comprising
  I. an unsaturated polyester comprising an $\alpha,\beta$-unsaturated dicarboxylic acid component and a saturated dicarboxylic acid component in a ratio of 75/25 to 35/65 by mol, wherein the saturated dicarboxylic acid component contains 90 or more % by mol of terephthalic acid component (on the basis of the dicarboxylic acid component), and
  II. a vinyl monomer and/or allyl monomer which are copolymerizable with the unsaturated polyester, wherein the ratio of (I)/(II) is in a range of 80/20 to 30/70 by weight, and
B. 3 to 30 parts by weight of at least one saturated polyester comprising a saturated dicarboxylic acid component which contains 50 to 90 % by mol of terephthalic acid component (on the basis of the saturated dicarboxylic acid component), and optionally, further a polymerization catalyst.

12 Claims, No Drawings

POLYESTER COMPOSITION CONTAINING SATURATED POLYESTER UNSATURATED TEREPHTHALATE POLYESTER AND VINYL MONOMER

The present invention relates to an unsaturated polyester resin composition. More particularly, it relates to an unsaturated polyester resin composition which can give a cure-molded product having excellent low shrink properties and low profile.

It is well known that when an unsaturated polyester resin composition comprising an unsaturated polyester and a vinyl monomer or allyl monomer as curing components is cured by radical polymerization method to give a molded product, it is unavoidable that there occurs a volume shrinkage, generally about a 7 to 10 % degree of volume shrinkage during curing. This causes the distortion, warp and cracking of the cure-molded product.

There have, hitherto, been proposed various methods to prevent such volume shrinkage during curing which is a peculiar defect of the unsaturated polyester resin composition. One of them is that a thermoplastic polymer soluble in vinyl monomer is added to the composition and thereby the observed shrinkage is reduced in accordance with separating and depositing of the thermoplastic polymer and foaming and expanding thereof by the curing heat. As the thermoplastic polymer, there may be used vinyl polymers (e.g. polymethyl methacrylate, copolymers of methyl methacrylate and other acrylates, polystyrene, polybutadiene or a copolymer of ethylenevinyl acetate) or condensation polymers (e.g. saturated polyester).

It is also well known that the kinds of the unsaturated polyester and the thermoplastic polymer and the combination thereof give very important effects on the shrinkage and other properties of the molded products.

The known unsaturated polyester resins used for such low shrink unsaturated polyester resin compositions are "high reactive resins", i.e. an unsaturated polyester wherein the acid component has the molar ratio of unsaturated dicarboxylic acid component/saturated dicarboxylic acid component of 75/25 or more, or so-called "unsaturated dicarboxylic acid straight type resin," i.e. an unsaturated polyester wherein the acid component comprises only unsaturated dicarboxylic acids. Thus, as the unsaturated polyester resins useful for the unsaturated polyester resin compositions being capable of giving cure-molded products having excellent low shrink properties, there have been known only high reactive resins comprising 75 to 100 % by mol of unsaturated dicarboxylic acid and 25 to 0 % by mol of saturated dicarboxylic acid, and unsaturated dicarboxylic acid straight type resin comprising 100 % by mol of unsaturated dicarboxylic acids. And, it has been considered that a "medium reactive resin" comprising 35 to 75 % by mol of unsaturated dicarboxylic acid and 65 to 25 % by mol of saturated dicarboxylic acid can not give such effect as reducing shrink properties of the product and giving low profile. The examples of the known unsaturated polyester resins useful for the low shrink unsaturated polyester resin compositions are an unsaturated polyester resin having a double bond equivalency of 150 to 186 (Japanese Pat. Publication No. 14541/1971), an unsaturated polyester resin having a double bond equivalency of 142 to 215 (Japanese Pat. Publication No. 41709/1971), an unsaturated polyester having a double bond of 0.45 to 0.67 mol per 100 g of the polyester (Japanese Pat. Publication No. 23423/1972), an unsaturated polyester produced from an ethylenically unsaturated dicarboxylic acid and a polyhydroalcohol (netherlands Pat. No. 7014568 and Japanese Pat. Opening No. 1789/1971), and an unsaturated polyester having a double bond equivalency of 142 to 165 (U.S. Pat. No. 3,736,278, and Japanese Pat. Opening Nos. 985/1973 and 986/1973).

However, when the high reactive unsaturated polyester resins are used, it is very difficult to control the curing reaction when molded, and further there are occasionally encountered crack and distortion in the inner part of the product due to the high exothermic heat since such molding compositions are highly reactive. Accordingly, it has rather been inclined to stress only the low shrink properties and low profile of the molded product, and to neglect the crack and distortion occurring in the inner part thereof.

Under the circumstances, there has been studied the relationship between the low shrink properties and the low profile of the cure-molded products and the chemical structure of the unsaturated polyester and the thermoplastic polymer. As the results, there has now been found a novel unsaturated polyester resin composition which can give a cure-molded product having excellent low shrink properties and low profile.

The unsaturated polyester resin composition of the present invention comprises

A. 70 to 97 parts by weight of an unsaturated polyester resin comprising
   I. an unsaturated polyester comprising an α,β-unsaturated dicarboxylic acid component and a saturated dicarboxylic acid component in a ratio of 75/25 to 35/65 by mol, wherein the saturated dicarboxylic acid component contains 90 or more % by mol of terephthalic acid component (on the basis of the dicarboxylic acid component), and
   II. a vinyl monomer and/or allyl monomer which are copolymerizable with the unsaturated polyester, wherein the ratio of (I)/(II) is in a range of 80/20 to 30/70 by weight, and
B. 3 to 30 parts by weight of a saturated polyester comprising a saturated dicarboxylic acid component which contains 50 to 90 % by mol of terephthalic acid component (on the basis of the saturated dicarboxylic acid component), and optionally, further a polymerization catalyst.

The unsaturated polyester (I) containing terephthalic acid component is hereinafter referred to as "terephthalic acid type unsaturated polyester", and the unsaturated polyester resin (A) containing such terephthalic acid type unsaturated polyester is hereinafter referred to as terephthalic acid type unsaturated polyester resin, and further the saturated polyester (B) containing terephthalic acid component is hereinafter referred to as terephthalic acid type saturated polyester.

The terephthalic acid type unsaturated polyester used in the present invention contains terephthalic acid component, which is one of the most important characteristics of the present invention. The terephthalic acid type unsaturated polyester may also contain other components which are usually used for the conventional unsaturated polyester resins. The examples of the other unsaturated polyester components may be an α,β-unsaturated dicarboxylic acid, such as fumaric acid, maleic acid, itaconic acid, or citraconic acid as an unsaturated acid component; and a glycol, such as ethylene glycol, 1,2-propylene glycol, 1,3-butylene glycol, 1,4-butanediol, 1,6-hexanediol, diethylene glycol, dipropylene glycol, triethylene glycol, tripropylene glycol, polyethylene glycol, polypropylene glycol, neopentyl glycol, 2,2,4-trimethyl-1,3-pentanediol, hydrogenated bisphenols, hydrogenated bisphenol-alkylene oxide addition products, bisphenol-alkylene oxide addition products, halogenated bisphenol-alkylene oxide addition products, cyclohexanediol, or cyclohexanedimethanol as a glycol component. there may be optionally used tri- and tetraalcohols in a very small amount.

Furthermore, there may be used together other saturated dicarboxylic acids than terephthalic acid as the saturated acid component in a small amount. The examples of the other saturated dicarboxylic acids may be orthophthalic acid, isophthalic acid, succinic acid, adipic acid, sebacic acid, dodecamethylene dicarboxylic acid tetra- and hexahydrophthalic acid, halogentated phthalic acid, hexachloro-endo-methylene-tetrahydrophthalic acid, or endo-methylene-tetrahydrophthalic acid. It should be noted that such saturated acid components other than terephthalic acid component may be used only in a small amount, and the main parts of the acid components in the terephthalic acid type unsaturated polyester are terephthalic acid component and unsaturated dicarboxylic acid component. When any other saturated acid component is used together with terephthalic acid component, the amount of the other saturated acid component may be 10 or less % by mol on the basis of the dicarboxylic acid component.

The terephthalic acid type unsaturated polyester used in the present invention comprises an unsaturated dicarboxylic acid component and a saturated dicarboxylic acid component (i.e. terephthalic acid component, or a mixed component of terephthalic acid component and other saturated dicarboxylic acid component) in a specific molar ratio which is the most important and novel characteristic of the present invention. When the molar ratio of the unsaturated dicarboxylic acid component/terephthalic acid component (optionally a mixed component of terephthalic acid component and other saturated dicarboxylic acid component) is in a range of 75/25 to 35/65, the unsaturated polyester resin composition produced therefrom can give a cure-molded product having excellent low shrink properties. The most preferred molar ratio may be in a range of 65/35 to 45/55.

The terephthalic acid type unsaturated polyester resin comprising such unsaturated polyester in the above molar ratio of 65/35 to 45/55 is a typical medium reactive unsaturated polyester resin and has entirely different reactivity and characteristics from those of the conventional high reactive unsaturated polyester resins and unsaturated dicarboxylic acid straight type unsaturated polyester resins.

According to the present invention, a medium reactive unsaturated polyester resin becomes useful in the fields of low shrink resins, and therefore, the present invention can give an important contribution to the industry. It is well known that the chemical resistance of a cure-molded product made from an unsaturated polyester resin composition is remarkably increased with the lowering of the reactivity of the unsaturated polyester, i.e. with changing of the unsaturated polyester from high reactive type to low reactive type. Besides, when the unsaturated polyester resin is a high reactive type, it shows high exothermic heat during curing, which causes crack and distortion in the inner part of the molded product. The high reactive type unsaturated polyester resin in not suitable in in view of the fact that the curing temperature during molding is difficult to control owing to its high reactivity. From these points, there may be also made clear the importance of the present invention, by which the medium reactive type unsaturated polyester resin can be used in the fields of low shrink resins. Hitherto, the high reactive type or unsaturated dicarboxylic acid straight type unsaturated polyester resins have been prepared for the low shrink resins, but according to the present invention, the most convenient medium reactive type unsaturated polyester can be used for such low shrink resins.

The present terephthalic acid type unsaturated polyester may be produced by conventional methods, such as esterification and transesterification. The reaction may be carried out under pressure, under atmospheric pressure or under a reduced pressure, and if necessary, there may be added to the reaction system a suitable catalyst effective to promote the reaction, and further may added a very small amount of side reaction preventing agent or anticolorant. There may be adopted a one-stage process or a multi-stage process. The terephthalic acid type unsaturated polyester may be produced by using terephthalic acid, dialkyl terephthalate or diglycol terephthalate as the starting material, or by using a mixture of glycol and oligomer containing low molecular weight terephthalic acid component which is produced by degradating a saturated polyester containing terephthalic acid component by glycol.

The monomer copolymerizable with the terephthalic acid type unsaturated polyester may be vinyl monomer or allyl monomer which have been usually used for unsaturated polyester resins. The suitable examples of the monomer may be styrene, vinyltoluene, divinylbenzene, monochlorostyrene, tert.-butylstyrene, α-methylstyrene, methyl acrylate, methyl methacrylate, diallyl phthalate, diallyl fumarate, triallyl cyanurate, vinyl acetate, or a mixture thereof. Among them, a styrene is most available and can give the desired produced having excellent low shrink properties. Accordingly, unless specifically required, one need not to use other monomers than styrene.

The terephthalic acid type saturated polyester used in the present invention essentially contains terephthalic acid component as the dicarboxylic acid component. It may contain one or more kinds of other dicarboxylic acid components, such as orthophthalic acid, isophthalic acid, succinic acid, adipic acid, azelaic acid, sebacic acid, dodecamethylene dicarboxylic acid, tetra- and hexahydrophthalic acid, halogenated phthalic acid, hexachloroendo-methylene-tetrahydrophthalic acid, or endo-methylene-tetrahydrophthalic acid. The terephthalic acid type saturated polyester contains a glycol component, such as ethylene glycol, 1,2-propylene glycol, 1,3-buylene glycol, 1,4-butanediol, 1,6-hexanediol, diethylene glycol, dipropylene glycol, polyethylene glycol, polypropylene glycol, neopentyl glycol, 2,2,4-trimethyl-1,3-pentanediol, cyclohexanediol, cyclohexanedimethanol, hydrogenated bisphenol, hydrogenated bisphenol-alkylene oxide addition products, or bisphenol-alkylene oxide addition products. Among them, ethylene glycol, neopentyl glycol and diethylene glycol are preferable, and they may be used along or in a mixture thereof.

The amount of the terephthalic acid component in the terephthalic acid type saturated polyester is 50 or more % by mol on the basis of the dicarboxylic acid component. On the other hand, when the acid composed comprises only terephthalic acid component, it does not necessarily give the desired composition having excellent low shrink properties. The content of the terephthalic acid component may be preferably in a range of 50 to 90 % by mol, more preferably 60 to 80 % by mol on the basis of the dicarboxylic acid component.

The acid value and the degree of polycondensation of the terephthalic acid type saturated polyester give also important effect on the low shrink properties of the molded product. The terephthalic acid type saturated polyester may preferably have an acid value of 10 or less, more preferably 5 or less, and a degree of polycondensation, i.e. the intrinsic viscosity being in a range of 0.25 to 0.80, more preferably 0.40 to 0.70, which is measured in phenol/tetrachloroethaane: 6/4 by weight, at 25°C. The terephthalic acid type saturated polyester has enough solubility to styrene and can easily give a homogeneous solution in styrene which is very stable and can be stored for a long period.

The terephthalic acid type saturated polyester used in the present invention may be produced by esterification or transesterification, and the reaction may be usually carried out in the presence of a catalyst. There may be usually added a side reaction preventing agent and anticolorant. The reaction may be carried out by a one-stage process or a multi-stage process, and under atmospheric pressure or under a pressure at a first stage but under a reduced pressure at the final stage. The terephthalic acid type saturated polyester may be produced by using terephthalic acid, dialkyl terephthalate or diglycol terephthalate as the starting material, or by using a mixture of glycol and oligomer containing terephthalic acid component which is produced by degradating a saturated polyester containing terephthalic acid component by glycol.

It is well known that the low shrink properties of the unsaturated polyester resin composition obtained from a combination of an unsaturated polyester resin and a low shrinking agent, particularly a thermoplastic polymer may significantly vary according to the ratio of the component: the unsaturated polyester, monomers and the thermoplastic polymer, and further that the use of thermoplastic polymer in a large amount as a low shrinking agent may significantly decrease the peculiar characteristics of the unsaturated polyester resin. The present unsaturated polyester resin composition shows similar phenomena, and therefore, there is restricted the ratio of the component: the unsaturated polyester, monomers and the saturated polyester. That is, in the present unsaturated polyester resin composition, when the terephthalic acid type saturated polyester is contained in a amount of 3 or more % by weight, the resin composition shows remarkable low shrink properties, but it is not necessary to raise the content over 30 % by weight. The preferred range of the terephthalic acid type saturated polyester content may be in a range of 5 to 20 % by weight. The remaining parts, i.e. 97 to 70 % by weight, preferably 95 to 80 % by weight of the resin composition comprises the unsaturated polyester resin, which comprises the terephthalic acid type unsaturated polyester and monomers. The ratio of the terephthalic acid type unsaturated polyester and the monomers may be in a range of 80/20 to 30/70, more preferably 70/30 to 40/60 by weight.

The present unsaturated polyester resin composition comprises the terephthalic acid type unsaturated polyester resin and the terephthalic acid saturated polyester resin, wherein two or more kinds of each resin may be used. In other words, they may be used in a combination of two or more kinds of the former and one kind of the latter, in a combination of one kind of the former and two or more kinds of the latter, or in a combination of two or more kinds of the former and two or more kinds of the latter.

The unsaturated polyester resin composition of the present invention may be produced by any conventional methods, such as by dissolving the terephthalic acid type unsaturated polyester and the terephthalic acid type saturated polyester in monomers, by dissolving the terephthalic acid type saturated polyester in a solution of the terephthalic acid type unsaturated polyester in monomer, by dissolving the terephthalic acid type unsaturated polyester in a solution of the terephthalic acid type saturated polyester in monomers, or by mixing a solution of the terephthalic acid type unsaturated polyester resin in monomers with a solution of the terephthalic acid type saturated polyester in monomrs. Among them, the last method, i.e. the mixing of the two kinds of solution is most convenient and practical.

The unsaturated polyester resin composition of the present invention can be cured in the presence of polymerization catalyst (and polymerization promoter or the like) to give a molded product having excellent low shrink properties. When is it used in a form of a molding compound, such as premix, prepreg, bulk molding compound (BMC) or sheet molding compound (SMC), it can give particularly excellent low shrink properties and other characteristics to the product. For producing such molding compound, there may be added a reinforcement such as glass fiber, and other conventional additives, such as filler (e.g. calcium carbonate), colorant, fire retardant, lubricant or pigment to the unsaturated polyester resin composition. When the unsaturated polyester resin composition is used for such molding compound, e.g. premix, prepreg, BMC or SMC, it is generally required that it can give excellent low shrink properties and low profile to the cure-molded product. The unsaturated polyester resin composition of the present invention can give the desired molding compound satisfying such essential requirements, and therefore very useful.

It is well known that a low shrink unsaturated polyester resin composition or a molding compound produced therefrom must be cure-molded by heating for exhibiting such excellent low shrink properties. Accordingly, it is important to cure-mold the present unsaturated polyester resin composition or the molding compound thereof by heating, for exhibiting such excellent low shrink properties and low profile. Though the suitable temperature may vary according to the kinds of the monomers and polymerization catalysts, it may usually be in a range of 60° to 200°C, preferably 100° to 180°C.

The unsaturated polyester resin composition of the present invention has the following characteristics:
1. It is a medium reactive type unsaturated polyester resin composition. The present composition shows excellent low shrink properties different from that of a composition of the known high reactive type or unsaturated dicarboxylic acid straight type polyester resin and a thermoplastic polymer (low shrinking agent). The latter composition has been considered to show low shrink properties owing to its high exothermic temperature, by which the foaming of the thermoplastic polymer is promoted to give a highly foamed product and results in low shrinkage, but such theory can not be applied to the present composition which is medium reactive type. The present composition does not show such defects as crack or distortion in the inner part of the product as observed in the product made from the known compositions, and has improved corrosion resistance of the product in comparison with the conventional one.

2. It is extremely stable. According to the known composition comprising a high reactive type or unsaturated dicarboxylic acid straight type unsaturated polyester resin and a low shrinkage agent (e.g. polystyrene or methyl methacrylate/ethyl methacrylate copolymer), the low shrinking agent is stable in a form of a solution in styrene, but has low compatibility with the high reactive type or unsaturated dicarboxylic acid straight type unsaturated polyester resin, which easily causes separation of the mixture thereof into each component, and therefore, they must be mixed very shortly before use. Accordingly, these resins have been usually called "two-solution type low shrink unsaturated polyester resin." On the contrary, the composition of the present invention has excellent stability and may be called "one-solution type low shrink unsaturated polyester resin composition".

3. It has excellent low shrink properties and also excellent low profile. The medium reactive type unsaturated polyester resin composition of the present invention shows superior low shrink properties and low profile in comparison with those of the known high reactive type or unsaturated dicarboxylic acid straight type unsaturated polyester resin composition.

4. It can give a cure-molded product having excellent mechanical strengths. The cure-molded product produced from the composition of the present invention does not show such inferior pigmentability of the colorant, i.e. unevenness of color as observed in the conventional products produced by using the known low shrinkage agent (e.g. polystyrene or methyl methacrylate/ethyl methacrylate copolymer) and the known high reactive type or unsaturated dicarboxylic acid straight type unsaturated polyester esin.

The present invention is illustrated by the following examples but not limited thereto. In the examples, "part" and "%" mean part by weight and % by weight, respectively.

The mechanical properties of the cure-molded product were tested by procedure of JIS K 6911.

The cure shrinkage for evaluating the low shrink properties of the product was calculated by the following equation, wherein a metal die for square bar (15.0 mm × 15.0 mm × 90.0 mm) was used:

$$\text{Cure shrinkage (\%)} = \frac{lo - l}{lo} \times 100$$

wherein $lo$ was the length of the die and $l$ was the length of the cure-molded product. The molding was carried out under the same conditions as in Example 1, and the cure-molded product was allowed to stand at 20°C for one day in an atmosphere having humidity of 65 % and then the length thereof ($l$) was measured. The value in the Examples shows the mean of those of five cure-molded products.

The surface roughness for evaluating the low profile was measured as follows:

A cure-molded product was produced by using a metal die for plate (150 mm × 250 mm × 3.0 mm), and the roughness of the surface of the product is measured on a cross line at the middle part of the surface (each 100 mm in length) at 25°C by "Ultraroughness Tester," type AB-2 (made by Mitsutoyo Seisakusho Co.; magnification: × 500, rate of travel of needle: 2.5 mm/minute, diamond needle: needle angle of 70°C and point radius of 5 ¾), and the sum of the values thus measured are shown in the Examples (unit:   ).

The terephthalic acid type unsaturated polyester resin was prepared as follows:

A five liters stainless steel autoclave provided with a stirrer, thermometer, nitrogen gas-introducing tube and partial condenser having a thermometer on the top was charged with terephthalic acid (1162 parts), propylene glycol (1064 parts) and potassium titanyl oxalate (0.50 part). The mixture was heated gradually, and esterification was carried out at 230°C, under 3.5 kg/cm²G for 3 hours. After cooling to 180°C, the mixture was mixed homogeneously with hypophosphorous acid (1.1 parts). To the mixture were added fumaric acid (812 parts) and propylene glycol (53.2 parts), and then the mixture was reacted at 210°C, under atmospheric pressure for 8 hours in nitrogen gas to give colorless and clear unsaturated polyester having acid value of 12 (the terephthalic acid type unsaturated polyester: TUP-5 in Table 1). A part of the unsaturated polyester thus obtained was dissolved in styrene containing 0.005 % of hydroquinone to give an unsaturated polyester resin. The ratio of unsaturated polyester/styrene was 60/40 by weight. The number of colors of the resin was APHA (American Public Health Association) 100 or less.

The other terephthalic acid type unsaturated polyester resins were produced in the same manner as described above. On the other hand, orthophthalic acid type, isophthalic acid type or unsaturated dicarboxylic acid straight type unsaturated polyester and resins thereof, which were used as a control, are produced by a conventional method, wherein the isophthalic acid type unsaturated polyester was produced by two-stage process and other polyesters were produced by one-stage process.

The terephthalic acid type unsaturated polyester resins used in the Examples and the Comparative Examples are shown in Table 1. The unsaturated polyester resins used in the Comparative Examples are shown in Table 2.

Table 1

| Number of terephthalic acid type unsaturated polyester resin (TUP) | Terephthalic acid type unsaturated polyester | | | | | Acid value | Styrene (%) | Double bond equivalency |
|---|---|---|---|---|---|---|---|---|
| | Amounts of the starting material (molar ratio)[*1] | | | | | | | |
| | Terephthalic acid | Other unsaturated acid[*2] | Fumaric acid | Propylene glycol | Other glycol[*3] | | | |
| TUP-1 | 2.5 | — | 7.5 | 10 | — | 12 | 30 | 225 |
| TUP-2 | 3.5 | — | 6.5 | 10 | — | 17 | 30 | 266 |
| TUP-3 | 3.5 | — | 6.5 | 9 | NPG 1 | 14 | 30 | 269 |
| TUP-4 | 4 | — | 6 | 7 | DPG 3 | 9 | 30 | 322 |
| TUP-5 | 5 | — | 5 | 10 | — | 12 | 30 | 362 |
| TUP-6 | 4.5 | IPA 0.5 | 5 | 10 | — | 9 | 30 | 362 |
| TUP-7 | 4 | OPA 1 | 5 | 8 | EG 2 | 6 | 30 | 356 |
| TUP-8 | 5.5 | — | 4.5 | 9 | NPG 1 | 10 | 30 | 411 |
| TUP-9 | 6 | — | 4 | 10 | — | 5 | 30 | 465 |

[*1] 5% excess amount of glycol was added.
[*2] IPA: isophthalic acid, OPA: phthalic anhydride
[*3] NPG: neopentyl glycol, DPG: dipropylene glycol, EG: ethylene glycol Table 2

| Number of unsaturated polyester resin (UP) | Unsaturated polyester | | | | | Acid value | Styrene (%) | Double bond equivalency |
|---|---|---|---|---|---|---|---|---|
| | Amounts of the starting material (molar ratio)[*1] | | | | | | | |
| | Phthalic anhydride | Isophthalic acid | Fumaric acid | Propylene glycol | Other glycol[*2] | | | |
| UP-1 | — | — | 10 | 10 | — | 29 | 30 | 156 |
| UP-2 | 2 | — | 8 | 9 | NPG 1 | 25 | 30 | 206 |
| UP-3 | — | 3.3 | 6.7 | 10 | — | 10 | 30 | 258 |
| UP-4 | 5 | — | 5 | 10 | — | 32 | 30 | 362 |
| UP-5 | — | 5 | 5 | 10 | — | 9 | 30 | 362 |
| UP-6 | — | 6 | 4 | 7 | DPG 3 | 15 | 30 | 508 |

[*1] 5 % excess amount of glycol was added.
[*2] NPG: neopentyl glycol, DPG: dipropylene glycol The terephthalic acid type saturated polyester was produced as follows:

A five liters stainless steel autoclave provided with a stirrer, thermometer, nitrogen gas-introducing tube and partial condenser having a thermometer on the top was charged with terephthalic acid (1163 parts), ethylene glycol (870 parts), neopentyl glycol (625 parts) and potassium titanyl oxalate (0.25 part). The mixture was heated gradually, and esterification was carried out at 220°C, at 3.0 kg/cm²G for 2 hours. After the pressure was reduced to atmosphere, sebacic acid (607 parts) was added to the reaction mixture, and then the mixture was reacted at 250°C for 30 minutes. The pressure of the reaction atmosphere was gradually reduced and finally to 0.1 mmHg or less, and then the mixture was further reacted at 280°C for 30 minutes under the reduced pressure to give terephthalic acid type saturated polyester (TPES-6 in Table 3). The intrinsic viscosity of the polyester is 0.57 in phenol/ tetrachloroethane: 6/4 by weight at 25°C.

The terephthalic acid type saturated polyester (30 parts) thus obtained was added to styrene containing 0.0015 % of hydroquinone (70 parts) and heated at 60°C to give a clear solution. The styrene solution was very stable and could be stored at 25°C for a long period without any change in appearance. The styrene solution (10 parts) was mixed well with the terephthalic acid type unsaturated polyester resin (TUP-5 in Table 1; 20 parts) obtained hereinbefore and then the mixture was allowed to stand. As the results, the homogeneous solution could be maintained for a long period without any change in its homogeneity.

Other terephthalic acid type polyesters used in the Examples and the Comparative Examples were produced in the same manner as described above. Other saturated polyesters used as a control were produced in similar manner as described above, wherein polystyrene (Dialex HT-44, made by Mitsubishi Monsanto Chemical Co.), polymethyl methacrylate (Acrypet-M, made by Mitsubishi Rayon Co.) and methyl methacrylate/ethyl methacrylate copolymer (Paraplex 19B, made by Rohm & Haas Co.) were used.

The terephthalic acid type saturated polyesters used in the Examples and the Comparative Examples are shown in Table 3. The other saturated polyesters used in the Comparative Examples are shown in Table 4.

The solubility of the polyesters in styrene as mentioned in Tables 3 and 4 was evaluated as follows:

The unsaturated polyester (30 parts) was added to styrene containing 0.0015 % of hydroquinone (70 parts) and the mixture was heated at 60°C, and then the solubility thereof was classified as follows:

⊚: It was extremely easily dissolved.
○: It was dissolved well.
△: It was somewhat difficult to be dissolved.
X: It was hardly dissolved.

The stability of the styrene solution as mentioned in Tables 3 and 4 was evaluated as follows:

The styrene solution obtained in the above solubility evaluation test was allowed to stand at 25°C and then the stability thereof was classified as follows:

⊚: It could be stably kept for a long period.
○: A small amount of precipitates was observed when it was kept for a long period.
△: It changed into a sol after kept, but could be recovered to the solution by heating.
X: A large amount of precipitates was immediately observed.

Table 3

| Number of terephthalic acid type saturated polyester (TPES) | Terephthalic acid type saturated polyester ||||  Intrinsic viscosity[η]*4 | Solubility in styrene | Stability of styrene solution |
| --- | --- | --- | --- | --- | --- | --- | --- |
| | Amounts of the starting material (molar ratio)*1 |||| | | |
| | Terephthalic acid | Other saturated acid*2 | Ethylene glycol | Other glycol*3 | | | |
| TPES-1 | 8 | AD 2 | 5 | DEG 5 | 0.48 | ◎ | ◎ |
| TPES-2 | 8 | AD 2 | 4 | NPG 6 | 0.57 | ◎ | ◎ |
| TPES-3 | 8 | SA 2 | 7 | NPG 3 | 0.61 | ◎ | ◎ |
| TPES-4 | 7 | AD 3 | 5 | NPG 5 | 0.55 | ◎ | ◎ |
| TPES-5 | 7 | IPA 3 | 3 | NPG 7 | 0.51 | ◎ | ◎ |
| TPES-6 | 7 | SA 3 | 7 | NPG 3 | 0.57 | ◎ | ◎ |
| TPES-7 | 6 | SA 4 | 6 | NPG 4 | 0.52 | ◎ | ◎ |
| TPES-8 | 6 | IPA 4 | 5 | NPG 5 | 0.55 | ◎ | ◎ |
| TPES-9 | 6 | SA 4 | — | NPG 10 | 0.50 | ◎ | ◎ |
| TPES-10 | 5 | IPA 5 | 4 | DEG 6 | 0.57 | ◎ | ◎ |
| TPES-11 | 5 | SA 5 | 7 | NPG 3 | 0.56 | ◎ | ◎ |

*1 100 % excess amount of glycol was added.
*2 AD: adipic acid, SA: sebacic acid, IPA: isophthalic acid
*3 DEG: diethylene glycol, NPG: neopentyl glycol
*4 It was measured in phenol/tetrachloroethane: 6/4 by weight, at 25°C.

Table 4

| Number of saturated polyester (PES) | Saturated polyester ||| Intrinsic viscosity [η] | Solubility in styrene | Stability of styrene solution |
| --- | --- | --- | --- | --- | --- | --- |
| | Amounts of the starting material (molar ratio)*1 ||| | | |
| | Acid*2 | Glycol*3 | | | | |
| PES-1 | TPA 10 | EG 10 | — | 0.60 | X | X |
| PES-2 | TPA 10 | NPG 10 | — | 0.57 | X | X |
| PES-3 | SA 10 | EG 10 | — | 0.50 | X | X |
| PES-4 | TPA 10 | EG 5 | NPG 5 | 0.54 | ◯ | Δ |
| PES-5 | SA 10 | EG 5 | NPG 5 | 0.58 | ◯ | ◯ |
| PES-6 | IPA 10 | EG 5 | NPG 5 | 0.52 | ◯ | ◯ |
| PES-7 | OPA 10 | EG 5 | NPG 5 | 0.55 | ◯ | ◯ |

*1 When TPA was used, 100 % excess amount of glycol was added.
*2 TPA: terephthalic acid, SA: sebacic acid, IPA: isophthalic acid, OPA: orthophthalic acid
*3 EG: ethylene glycol, NPG: neopentyl glycol
*4 It was measured in phenol/tetrachloroethane: 6/4 by weight, at 25°C.

EXAMPLE 1

A terephthalic acid type unsaturated polyester resin (20 parts) as shown in Table 1 was mixed well with a solution of a terephthalic acid type saturated polyester as shown in Table 3 in styrene (styrene: 70 %; 10 parts) at room temperature to give the desired unsaturated polyester resin composition. It was allowed to stand at 25°C for evaluating its stability. The results are shown in Table 5, in which the stability was classified as follows:

◎: The solution was stably kept in homogeneous state for a long period.
◯: The solution was stably kept in homogeneous state for several days.
Δ: The solution was kept in homogeneous state for several hours.
X: The solution was separated into each component within a short time.

The stability of the solution of the terephthalic acid type saturated polyester in styrene was the same as shown in Table 3.

Table 5

| Terephthalic acid type saturated polyester (TPES) | Stability of styrene solution | Terephthalic acid type unsaturated polyester resin (TUP) | Stability of terephthalic acid type unsaturated polyester resin composition |
| --- | --- | --- | --- |
| TPES-1 | ◎ | TUP-1 | X |
| " | ◎ | TUP-9 | Δ |
| TPES-2 | ◎ | TUP-1 | Δ |
| " | ◎ | TUP-2 | ◯ |
| " | ◎ | TUP-5 | ◯ |
| TPES-3 | ◎ | TUP-3 | Δ |
| " | ◎ | TUP-4 | ◯ |
| " | ◎ | TUP-6 | ◯ |
| TPES-4 | ◎ | TUP-1 | ◯ |
| " | ◎ | TUP-3 | ◯ |
| " | ◎ | TUP-5 | ◯ |
| " | ◎ | TUP-7 | ◯ |
| TPES-5 | ◎ | TUP-2 | ◎ |
| " | ◎ | TUP-6 | ◎ |
| " | ◎ | TUP-8 | ◎ |
| " | ◎ | TUP-9 | ◯ |
| TPES-6 | ◎ | TUP-1 | ◎ |
| " | ◎ | TUP-5 | ◎ |
| " | ◎ | TUP-7 | ◎ |
| TPES-7 | ◎ | TUP-3 | ◎ |
| " | ◎ | TUP-6 | ◎ |
| " | ◎ | TUP-9 | ◎ |
| TPES-8 | ◎ | TUP-2 | ◎ |
| " | ◎ | TUP-6 | ◎ |
| TPES-9 | ◎ | TUP-1 | Δ |
| " | ◎ | TUP-4 | ◯ |
| " | ◎ | TUP-9 | ◯ |
| TPES-10 | ◎ | TUP-3 | ◯ |
| " | ◎ | TUP-5 | ◯ |
| TPES-11 | ◎ | TUP-2 | ◯ |
| " | ◎ | TUP-7 | ◯ |
| " | ◯ | TUP-8 | ◯ |

COMPARATIVE EXAMPLE 1

In the same manner as described in Example 1, a terephthalic acid type unsaturated polyester resin (20 parts) as shown in Table 1 was mixed well with a solution of a saturated polyester as shown in Table 4 and other thermoplastic polymer in styrene (styrene: 70; %; 10 parts) at room temperature to give an unsaturated polyester resin composition. It was allowed to stand at 25°C for evaluating its stability. The results are shown in Table 6, in which the classification of the stability was the same as in Example 1.

Table 6

| Saturated polyester and thermoplastic polymer | Stability of styrene solution | Terephthalic acid type unsaturated polyester resin | Stability of terephthalic acid type unsaturated polyester resin composition |
| --- | --- | --- | --- |
| PES-1 | X | TUP-2 | X |
| " | X | TUP-5 | X |
| PES-2 | X | TUP-3 | X |
| " | X | TUP-4 | X |
| " | X | TUP-7 | X |
| PES-3 | X | TUP-1 | X |
| " | X | TUP-6 | X |
| PES-4 | Δ | TUP-1 | Δ |
| " | Δ | TUP-4 | X |
| " | Δ | TUP-8 | X |
| PES-5 | ◯ | TUP-2 | X |
| " | ◯ | TUP-5 | X |
| " | ◯ | TUP-9 | X |
| PES-6 | ◯ | TUP-2 | ◯ |
| " | ◯ | TUP-5 | ◯ |
| " | ◯ | TUP-8 | ◯ |
| PES-7 | ◯ | TUP-1 | ◯ |
| " | ◯ | TUP-3 | ◯ |
| " | ◯ | TUP-7 | ◯ |
| Polystyrene | ◯ | TUP-1 | X |
| " | ◯ | TUP-4 | X |
| " | ◯ | TUP-5 | X |
| " | ◯ | TUP-7 | X |
| Polymethyl methacrylate | ◯ | TUP-2 | X |
| " | ◯ | TUP-4 | X |
| " | ◯ | TUP-6 | X |
| " | ◯ | TUP-8 | X |
| Paraplex 19B⁻¹ | ◯ | TUP-1 | X |
| " | ◯ | TUP-3 | X |
| " | ◯ | TUP-5 | X |
| " | ◯ | TUP-9 | X |

⁻¹Paraplex 19B was prepared so as to be 70 % of styrene content.

EXAMPLE 2

A terephthalic acid type unsaturated polyester resin (27 parts) as shown in Table 1 was mixed well with a solution of a terephthalic acid type saturated polyester as shown in Table 3 in styrene (styrene: 70 %; 13 parts) by a mixer, and thereto is further added benzoyl peroxide (Sanperox BPO, made by Sanken Kako Co.; 0.4 part) and the mixture was mixed well by a mixer. The mixture was then mixed with zinc stearate (first grade reagent; 1 part) and calcium carbonate (NS No. 100, made by Nitto Funka Co.; 60 parts), in a kneader to give a composition.

The composition (65 g) thus obtained was charged into a metal die for square bar and molded on the following conditions:

| | |
| --- | --- |
| Temperature: | 130°C |
| Primary pressure: | 60 kg/cm² |
| Time for the primary pressure: | 2 seconds |
| Secondary pressure: | 100 kg/cm² |
| Time for the secondary pressure: | 3 minutes |
| Time for pressure: | 5 minutes |
| Control speed: | 8 mm/second |

The shrinkage was measured, and surface smoothness and luster of the square bar obtained were evaluated. The results are shown in Table 7, wherein the surface smoothness and luster were classified as follows:

◎: excellent
◯: good
Δ: poor
X: worst

Table 7

| Terephthalic acid type unsaturated polyester resin (TUP) | Terephthalic acid type saturated polyester (TPES) | Shrinkage of the molded product (%) | Surface smoothness and luster |
| --- | --- | --- | --- |
| TUP-1 | TPES- 2 | 0.23 | ◯ |
| " | TPES- 4 | 0.21 | ◯ |
| " | TPES- 6 | 0.19 | ◯ |
| " | TPES- 9 | 0.20 | ◯ |
| TUP-3 | TPES- 2 | 0.12 | ◎ |
| " | TPES- 3 | 0.12 | ◎ |
| " | TPES- 5 | 0.10 | ◎ |
| " | TPES-11 | 0.17 | ◯ |
| TUP-4 | TPES- 1 | 0.24 | ◯ |
| " | TPES- 5 | 0.14 | ◎ |
| " | TPES- 6 | 0.10 | ◎ |
| " | TPES- 9 | 0.14 | ◯ |
| TUP-5 | TPES- 3 | 0.16 | ◯ |
| " | TPES- 4 | 0.13 | ◯ |
| " | TPES- 7 | 0.12 | ◎ |
| " | TPES- 8 | 0.12 | ◎ |
| TUP-7 | TPES- 2 | 0.15 | ◎ |
| " | TPES- 5 | 0.12 | ◎ |
| " | TPES- 8 | 0.10 | ◎ |
| " | TPES-11 | 0.16 | ◯ |
| TUP-9 | TPES- 6 | 0.19 | ◯ |
| " | TPES- 8 | 0.20 | ◯ |
| " | TPES- 9 | 0.21 | ◯ |
| " | TPES-11 | 0.20 | ◎ |

COMPARATIVE EXAMPLE 2

In the same manner as described in Example 2, a composition was prepared from a terephthalic acid type unsaturated polyester resin (27 parts) as shown in Table 1, a solution of a saturated polyester as shown in Table 4 in styrene (styrene: 70 %; 13 parts) or a solution of other thermoplastic polymer in styrene (styrene: 70 %; 13 parts), benzoyl peroxide (Sanperox BPO; made by Sanken Kako Co.; 0.4 part), zinc stearate (first grade reagent; 1 part) and calcium carbonate (NS No. 100, made by Nitto Funka Co.; 60 parts).

The composition was molded in the same manner as described in Example 2 to give square bar, on which the shrinkage, surface smoothness and luster were evaluated. The results are shown in Table 8, wherein the surface smoothness and luster were classified as in Example 2.

Table 8

| Saturated polyester and thermoplastic polymer | Terephthalic acid type unsaturated polyester resin (TUP) | Shrinkage of the molded product (%) | Surface smoothness and luster |
| --- | --- | --- | --- |
| PES-2 | TUP-1 | 2.30 | X |
| " | TUP-4 | 2.66 | X |
| " | TUP-6 | 2.91 | X |
| PES-4 | TUP-1 | 0.59 | ◯ |
| " | TUP-3 | 0.71 | ◯ |
| " | TUP-5 | 0.92 | Δ |
| " | TUP-9 | 1.32 | X |
| PES-5 | TUP-1 | 0.82 | ◯ |
| " | TUP-2 | 0.99 | Δ |
| " | TUP-6 | 1.03 | Δ |
| " | TUP-8 | 1.14 | Δ |
| PES-6 | TUP-2 | 0.79 | ◯ |
| " | TUP-4 | 1.07 | Δ |
| " | TUP-6 | 1.24 | X |
| " | TUP-9 | 1.43 | X |

Table 8-continued

| Saturated polyester and thermoplastic polymer | Terephthalic acid type unsaturated polyester resin (TUP) | Shrinkage of the molded product (%) | Surface smoothness and luster |
|---|---|---|---|
| PES-7 | TUP-3 | 0.67 | ○ |
| " | TUP-5 | 0.92 | △ |
| " | TUP-7 | 0.99 | △ |
| " | TUP-8 | 1.20 | △ |
| Polystyrene | TUP-2 | 0.41 | X |
| " | TUP-5 | 0.60 | X |
| " | TUP-8 | 0.92 | X |
| Polymethyl methacrylate | TUP-3 | 0.33 | ◎ |
| " | TUP-6 | 0.47 | ◎ |
| " | TUP-8 | 0.61 | ◎ |
| Paraplex 19B*[1] | TUP-2 | 0.44 | ○ |
| " | TUP-7 | 0.68 | △ |
| " | TUP-9 | 0.96 | △ |

*[1]Paraplex 19B was prepared so as to be 70 % of styrene content.

COMPARATIVE EXAMPLE 3

In the same manner as described in Example 2, a composition was prepared from an unsaturated polyester resin (27 parts) as shown in Table 2, a solution of a terephthalic acid type saturated polyester as shown in Table 3 in styrene (styrene: 70 %; 13 parts), benzoyl peroxide (Sanperox BPO; made by Sanken Kako Co.; 0.4 part), zinc stearate (first grade reagent; 1 part) and calcium carbonate (NS No. 100, made by Nitto Funka Co.; 60 parts).

The composition was molded in the same manner as described in Example 2 to give square bar, on which the shrinkage, surface smoothness and luster were evaluated. The results are shown in Table 9, wherein the surface smoothness and luster were classified as in Example 2.

Table 9

| Unsaturated polyester resin (UP) | Terephthalic acid type saturated polyester (TPES) | Shrinkage of the molded product (%) | Surface smoothness and luster |
|---|---|---|---|
| UP-1 | TPES-4 | 0.85 | △ |
| " | TPES-6 | 0.79 | ○ |
| " | TPES-9 | 0.72 | ○ |
| UP-2 | TPES-2 | 0.95 | △ |
| " | TPES-5 | 0.73 | ○ |
| " | TPES-10 | 0.89 | △ |
| UP-3 | TPES-2 | 0.69 | ○ |
| " | TPES-7 | 0.33 | ◎ |
| " | TPES-11 | 0.92 | △ |
| UP-4 | TPES-3 | 0.71 | ○ |
| " | TPES-6 | 0.43 | ◎ |
| " | TPES-10 | 1.03 | △ |
| UP-6 | TPES-2 | 1.46 | X |
| " | TPES-5 | 1.02 | △ |
| " | TPES-9 | 1.09 | △ |

EXAMPLE 3

A terephthalic acid type unsaturated polyester resin as shown in Table 1 was mixed with a solution of a terephthalic acid type saturated polyester as shown in Table 3 in styrene (styrene: 70 %) by a high-speed mixer for 5 minutes, and thereto was added t-butyl perbenzoate (Sanperox TB, made by Sanken Kako Co.; 0.27 part), and the mixture was mixed for 1 minute. The mixture was then mixed with zinc stearate (first grade reagent; 0.90 part) and calcium carbonate (NS No. 100, made by Nitto Funka Co.; 50 parts) in a kneader for 10 minutes, and thereto was added glass fiber (chopped strand, ERG-2310-3346W, 1/4, made by Nippon Glass Fiber Co.; 20 parts) for 5 minutes, and the mixture was further mixed to give a premix composition. The amount of the terephthalic acid type unsaturated polyester resin and the styrene solution was 30 parts in total, and the ratio of the unsaturated polyester resin/styrene solution was varied within that amount.

The premix composition thus obtained was molded by a metal die for square bar to give a square bar which was used for evaluating the shrinkage. The composition was further molded by a metal die for plate to give a plate which was used for evaluating the mechanical properties and the surface roughness. The molding conditions were as follows, respectively.

| | |
|---|---|
| Molding for square bar: | |
| Charged amount: | 65 g |
| Primary pressure and time: | 60 kg/cm$^2$; 2 second |
| Secondary pressure and time: | 120 kg/cm$^2$; 2.5 minutes |
| Time for pressure: | 3 minutes |
| Control speed: | 8 mm/second |
| Temperature: | 140°C |
| Molding for plate: | |
| Charged amount: | 385 g |
| Primary pressure and time: | 40 kg/cm$^2$; 2 seconds |
| Secondary pressure and time: | 80 kg/cm$^2$; 2.5 minutes |
| Time for pressure: | 3 minutes |
| Control speed: | 8 mm/second |
| Temperature: | 140°C |

The shrinkage, flexural strength, flexural modulus, Barcol hardness and surface roughness of the molded product are shown in Table 10.

Table 10

| Terephthalic acid type unsaturated polyester resin (TUP) | Styrene solution of terephthalic acid type saturated polyester (TPES) | Unsaturated polyester resin/styrene solution | Flexural strength (kg/mm$^2$) | Flexural modulus (kg/mm$^2$) | Barcol hardness | Shrinkage (%) | Surface roughness ($\mu$) |
|---|---|---|---|---|---|---|---|
| TUP-3 | TPES-6 | 8/2 | 11.9 | 1092 | 40 | 0.18 | 46 |
| " | " | 7/3 | 11.2 | 1065 | 38 | 0.10 | 20 |
| " | " | 6/4 | 9.4 | 903 | 30 | 0.09 | 19 |
| " | TPES-9 | 7/3 | 10.5 | 1034 | 39 | 0.11 | 23 |
| TUP-4 | TPES-1 | 7/3 | 12.0 | 1124 | 39 | 0.13 | 30 |
| " | TPES-5 | 8/2 | 11.1 | 1043 | 40 | 0.11 | 23 |
| " | " | 7/3 | 11.2 | 1087 | 39 | 0.11 | 19 |
| TUP-5 | TPES-4 | 8/2 | 11.4 | 1192 | 38 | 0.10 | 17 |

Table 10-continued

| Terephthalic acid type unsaturated polyester resin (TUP) | Styrene solution of terephthalic acid type saturated polyester (TPES) | Unsaturated polyester resin/styrene solution | Flexural strength (kg/mm²) | Flexural modulus (kg/mm²) | Barcol hardness | Shrinkage (%) | Surface roughness (μ) |
|---|---|---|---|---|---|---|---|
| '' | TPES-7 | 7/3 | 10.4 | 1009 | 36 | 0.09 | 23 |
| '' | '' | 6/4 | 8.9 | 826 | 27 | 0.10 | 20 |
| TUP-8 | TPES-6 | 8/2 | 13.2 | 1155 | 39 | 0.14 | 37 |
| '' | '' | 7/3 | 12.7 | 1084 | 36 | 0.09 | 20 |
| '' | '' | 6/4 | 9.2 | 807 | 28 | 0.07 | 18 |
| '' | TPES-11 | 8/2 | 12.5 | 1121 | 44 | 0.16 | 43 |

COMPARATIVE EXAMPLE 4

In the same manner as described in Example 3, a premix composition was prepared from an unsaturated polyester resin as shown in Table 2, a solution of a terephthalic acid type saturated polyester in styrene (styrene: 70 %), t-butyl perbenzoate (Sanperox TB, made by Sanken Kako Co.; 0.27 part), zinc stearate (first grade reagent; 0.90 part), calcium carbonate (NS No. 100, made by Nitto Funka Co.; 50 parts) and glass fiber (chopped strand, ERG-2310-3346W, 1/4, made 2310-3346Nippon Glass Fiber Co.; 20 parts). The amount of the unsaturated polyester resin and the styrene solution was 30 parts in total, and the ratio of the unsaturated polyester resin/styrene solution was varied within that amount.

The premix composition thus obtained was molded in the same manner as in Example 3 to give a square bar and a plate, on which flexural strength, flexural modulus, Barcol hardness, shrinkage and surface roughness were measured. The results are shown in Table 11.

Table 11

| unsaturated polyester resin (UP) | Styrene solution of terephthalic acid type saturated polyester (TPES) | Unsaturated polyester resin/styrene solution | Flexural strength (kg/mm²) | Flexural modulus (kg/mm²) | Barcol hardness | Shrinkage (%) | Surface roughness (μ) |
|---|---|---|---|---|---|---|---|
| UP-3 | TPES-6 | 8/2 | 11.4 | 1095 | 42 | 0.30 | 75 |
| '' | '' | 7/3 | 11.3 | 1012 | 38 | 0.26 | 63 |
| '' | '' | 6/4 | 9.0 | 922 | 29 | 0.21 | 54 |
| UP-4 | TPES-4 | 8/2 | 8.7 | 1051 | 43 | 0.30 | 109 |
| '' | '' | 7/3 | 8.5 | 1004 | 38 | 0.25 | 78 |
| UP-5 | TPES-8 | 8/2 | 9.5 | 1010 | 42 | 0.31 | 126 |
| '' | '' | 7/3 | 9.3 | 910 | 39 | 0.27 | 90 |

COMPARATIVE EXAMPLE 5

In the same manner as described in Example 3, a premix composition was prepared from the terephthalic acid type unsaturated polyester resin (TUP-3) as shown in Table 1, a solution of thermoplastic polymer in styrene (styrene: 70 %), t-butyl perbenzoate (Sanperox TB, made by Sanken Kako Co.; 0.27 part), zinc stearate (first grade reagent; 0.09 part), calcium carbonate (NS No. 100, made by Nitto Funka Co.; 50 parts) and glass fiber (chopped strand, ERG-2310-3346W, 1/4, made by Nippon Glass Fiber Co.; 20 parts). The amount of the terephthalic acid type unsaturated polyester resin (TUP-3) and the styrene solution was 30 parts in total, and the ratio of the resin (TUP-3)/styrene solution was 7/3.

The premix composition was molded in the same manner as in Example 3 to give a square bar and a plate, on which flexural strength, flexural modulus, Barcol hardness, shrinkage and surface roughness were measured. The results are shown in Table 12.

Table 12

| Terephthalic acid type unsaturated polyester resin (TUP) | Styrene solution of thermoplastic polymer | Flexural strength (kg/mm²) | Flexural modulus (kg/mm²) | Barcol hardness | Shrinkage (%) | Surface roughness (μ) |
|---|---|---|---|---|---|---|
| TUP-3 | Polystyrene | 11.1 | 1050 | 44 | 0.32 | 135 |
| '' | Polymethyl methacrylate | 10.8 | 1024 | 45 | 0.31 | 114 |
| '' | Paraplex 19B* | 10.7 | 1070 | 46 | 0.35 | 150 |

[Note]: *Paraplex 19B was prepared so as to be 70 % of styrene content.

What is claimed is:

1. An unsaturated polyester resin composition comprising
   A. 70 to 97 parts by weight of at least one unsaturated polyester resin comprising
      I. an unsaturated polyester comprising an $\alpha, \beta$-unsaturated dicarboxylic acid component, a saturated dicarboxylic acid component in a ratio of 75/25 to 35/65 by mol, wherein the saturated dicarboxylic acid component contains 90 or more % by mol of terephthalic acid (on the basis of the saturated dicarboxylic acid component), and a glycol component, and II. a vinyl monomer and/or allyl monomer which are copolymerizable with the unsaturated polyester, wherein the ratio of (I)/(II) is in a range of 80/20 to 30/70 parts by weight, and B. 3 to 30 parts by weight of at least one saturated polyester comprising a saturated dicarboxylic acid component which contains 50 to 90% by mol of terephthalic acid (on the basis of the saturated dicarboxylic acid component) and a glycol component.

2. The unsaturated polyester resin composition according to claim 1, wherein the saturated polyester has an acid value of 10 or less and an intrinsic viscosity [$\eta$] of 0.25 to 0.80 (in phenol/tetrachloroethane: 6/4 by weight at 25°C).

3. The unsaturated polyester resin composition according to claim 1, wherein the unsaturated polyester comprises an $\alpha,\beta$-unsaturated dicarboxylic acid component and a saturated dicarboxylic acid component in a ratio of 65/35 to 45/55.

4. The unsaturated polyester resin composition according to claim 1, wherein the $\alpha,\beta$-unsaturated dicarboxylic acid component is a member selected from the group consisting of fumaric acid, maleic acid, itaconic acid and citraconic acid.

5. The unsaturated polyester resin composition according to claim 1, wherein the glycol component of the unsaturated polyester is a member selected from the group consisting of ethylene glycol, 1,2-propylene glycol, 1,3-butylene glycol, 1,4-butanediol, 1,6-hexanediol, diethylene glycol, dipropylene glycol, triethylene glycol, tripropylene glycol, polyethylene glycol, polypropylene glycol, neopentyl glycol, 2,2,4-trimethyl-1,3-pentanediol, hydrogenated bisphenols, hydrogenated bisphenol-alkylene oxide addition products, bisphenol-alkylene oxide addition products, halogenated bisphenol-alkylene oxide addition products, cyclohexanediol and cyclohexanedimethanol.

6. The unsaturated polyester resin composition according to claim 1, wherein the glycol component of the saturated polyester is a member selected from the group consisting of ethylene glycol, 1,2-propylene glycol, 1,3-butylene glycol, 1,4-butanediol, 1,6-hexanediol, diethylene glycol, dipropylene glycol, polyethylene glycol, polypropylene glycol, neopentyl glycol, 2,2,4-trimethyl-1,3-pentanediol, cyclohexanediol, cyclohexanedimethanol, hydrogenated bisphenol, hydrogenated bisphenol-alkylene oxide addition products and bisphenol-alkylene oxide addition products.

7. The unsaturated polyester resin composition according to claim 6, wherein the glycol is a member selected from the group consisting of ethylene glycol, neopentyl glycol and diethylene glycol, which is used alone or in a mixture thereof.

8. The unsaturated polyester resin composition according to claim 1, wherein the saturated dicarboxylic acid component contains 10 or less % by mol (on the basis of the saturated dicarboxylic acid component) of other saturated dicarboxylic acid selected from the group consisting of orthophthalic acid, isophthalic acid, succinic acid, adipic acid, sebacic acid, dodecamethylene dicarboxylic acid, tetra- and hexahydrophthalic acid, halogenated phthalic acid, hexachloro-endo-methylene-tetrahydrophthalic acid and endo-methylene-tetrahydrophthalic acid which is used alone or in a mixture therof.

9. The unsaturated polyester resin composition according to claim 1, wherein the vinyl monomer or allyl monomer copolymerizable with the unsaturated polyester is a member selected from the group consisting of styrene, vinyltoluene, divinylbenzene, monochlorostyrene, tert.-butylstyrene, $\alpha$-methylstyrene, methyl acrylate, methyl methacrylate, diallyl phthalate, diallyl fumarate, triallyl cyanurate, vinyl acetate and a mixture thereof.

10. The unsaturated polyester resin composition according to claim 9, wherein the monomer is styrene.

11. The unsaturated polyester resin composition according to claim 1, wherein a polymerization catalyst is further contained.

12. A cure-molded product prepared from the unsaturated polyester resin composition as set forth in claim 1.

* * * * *